US008784195B1

(12) United States Patent
Crowder, Jr.

(10) Patent No.: US 8,784,195 B1
(45) Date of Patent: Jul. 22, 2014

(54) AUTHENTICATION SYSTEM FOR GAMING MACHINES

(75) Inventor: Robert W. Crowder, Jr., Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 2134 days.

(21) Appl. No.: 11/423,370

(22) Filed: Jun. 9, 2006

Related U.S. Application Data

(63) Continuation-in-part of application No. 10/794,760, filed on Mar. 5, 2004.

(60) Provisional application No. 60/452,407, filed on Mar. 5, 2003.

(51) Int. Cl.
A63F 13/00 (2014.01)
A63F 9/24 (2006.01)

(52) U.S. Cl.
USPC .......... 463/29; 463/16; 463/17; 463/18; 463/19; 463/40; 463/41; 463/42; 713/176; 713/187

(58) Field of Classification Search
USPC .......... 463/29, 40–42; 713/176, 187
See application file for complete search history.

(56) References Cited

U.S. PATENT DOCUMENTS

| 3,662,105 A | 5/1972 | Hurst et al. |
| 4,448,419 A | 5/1984 | Telnaes |
| 4,676,506 A | 6/1987 | Crouch |
| 4,718,672 A | 1/1988 | Okada |
| 4,837,728 A | 6/1989 | Barrie et al. |
| 5,429,361 A | 7/1995 | Raven et al. |
| 5,655,961 A | 8/1997 | Acres et al. |
| 5,702,304 A | 12/1997 | Acres et al. |
| 5,741,183 A | 4/1998 | Acres et al. |
| 5,752,882 A | 5/1998 | Acres et al. |
| 5,759,102 A | 6/1998 | Pease et al. |
| 5,769,716 A | 6/1998 | Saffari et al. |

(Continued)

FOREIGN PATENT DOCUMENTS

| AU | 704691 | 4/1997 |
| EP | 0769769 A1 | 4/1997 |

(Continued)

OTHER PUBLICATIONS

Scott Oaks: "Java security, PASSAGE" Java Security, XX, XX, May 1, 2001, pp. 261-287, 309, XP002321663.

Primary Examiner — Ronald Laneau
Assistant Examiner — Ross Williams
(74) Attorney, Agent, or Firm — Brooke Quist; Marvin Hein

(57) ABSTRACT

Disclosed is a system and method that uses digital signature technology to authenticate the contents of one or more manifests located on a storage device. Each manifest contains a list of file records, where each record contains the name of a file stored on the storage device, and a SHA1 hash value derived from the contents of the file. At boot time, the gaming machine first authenticates the contents of the manifest and then verifies the contents of the files using the SHA1 value stored in the manifest. Files are verified using the SHA1, as they are needed, during the boot up of the operating system and throughout normal operation. This method reduces the boot time of the gaming machine and eliminates the need to check digital signatures for each individual file or over the entire contents of a non-secure media.

35 Claims, 6 Drawing Sheets

(56) References Cited

U.S. PATENT DOCUMENTS

| | | | |
|---|---|---|---|
| 5,770,533 A | 6/1998 | Franchi | |
| 5,779,545 A | 7/1998 | Berg et al. | |
| 5,796,389 A | 8/1998 | Bertram et al. | |
| 5,809,482 A | 9/1998 | Strisower | |
| 5,816,918 A | 10/1998 | Kelly et al. | |
| 5,820,459 A | 10/1998 | Acres et al. | |
| 5,833,536 A | 11/1998 | Davids et al. | |
| 5,833,540 A | 11/1998 | Miodunski et al. | |
| 5,836,817 A | 11/1998 | Acres et al. | |
| 5,851,148 A | 12/1998 | Brune et al. | |
| 5,876,284 A | 3/1999 | Acres et al. | |
| 5,885,158 A | 3/1999 | Torango et al. | |
| 5,919,091 A | 7/1999 | Bell et al. | |
| 5,967,896 A | 10/1999 | Jorasch et al. | |
| 5,984,779 A | 11/1999 | Bridgeman et al. | |
| 6,008,784 A | 12/1999 | Acres et al. | |
| 6,010,404 A | 1/2000 | Walker et al. | |
| 6,068,552 A | 5/2000 | Walker et al. | |
| 6,077,163 A | 6/2000 | Walker et al. | |
| 6,106,396 A | 8/2000 | Alcorn et al. | |
| 6,110,041 A | 8/2000 | Walker et al. | |
| 6,113,495 A | 9/2000 | Walker et al. | |
| 6,149,522 A * | 11/2000 | Alcorn et al. | 463/29 |
| 6,162,122 A | 12/2000 | Acres et al. | |
| 6,185,678 B1 * | 2/2001 | Arbaugh et al. | 713/2 |
| 6,244,958 B1 | 6/2001 | Acres | |
| 6,254,483 B1 | 7/2001 | Acres | |
| 6,257,981 B1 | 7/2001 | Acres et al. | |
| 6,280,328 B1 | 8/2001 | Holch et al. | |
| 6,302,790 B1 | 10/2001 | Brossard | |
| 6,312,333 B1 | 11/2001 | Acres | |
| 6,319,125 B1 | 11/2001 | Acres | |
| 6,364,768 B1 | 4/2002 | Acres et al. | |
| 6,371,852 B1 | 4/2002 | Acres | |
| 6,375,567 B1 | 4/2002 | Acres | |
| 6,375,569 B1 | 4/2002 | Acres | |
| 6,401,208 B2 * | 6/2002 | Davis et al. | 713/193 |
| 6,431,983 B2 | 8/2002 | Acres | |
| RE37,885 E | 10/2002 | Acres | |
| 6,463,535 B1 * | 10/2002 | Drews | 713/176 |
| 6,560,706 B1 * | 5/2003 | Carbajal et al. | 713/155 |
| 6,565,434 B1 | 5/2003 | Acres | |
| 6,595,856 B1 * | 7/2003 | Ginsburg et al. | 463/29 |
| 6,607,441 B1 | 8/2003 | Acres | |
| 6,629,150 B1 * | 9/2003 | Huded | 709/247 |
| 6,652,378 B2 | 11/2003 | Cannon et al. | |
| 6,712,697 B2 | 3/2004 | Acres | |
| 6,712,698 B2 | 3/2004 | Paulsen et al. | |
| 6,722,985 B2 | 4/2004 | Criss-Puszkiewicz | |
| 6,800,030 B2 | 10/2004 | Acres | |
| 6,832,958 B2 | 12/2004 | Acres et al. | |
| 6,907,522 B2 * | 6/2005 | Morais et al. | 713/2 |
| 6,910,964 B2 | 6/2005 | Acres | |
| RE38,812 E | 10/2005 | Acres et al. | |
| D531,333 S | 10/2006 | Acres et al. | |
| 7,137,004 B2 * | 11/2006 | England et al. | 713/176 |
| 7,159,240 B2 * | 1/2007 | England et al. | 726/6 |
| 7,179,170 B2 * | 2/2007 | Martinek et al. | 463/29 |
| 2001/0037438 A1 * | 11/2001 | Mathis | 711/163 |
| 2002/0002680 A1 * | 1/2002 | Carbajal et al. | 713/180 |
| 2002/0194209 A1 * | 12/2002 | Bolosky et al. | 707/205 |
| 2002/0194484 A1 * | 12/2002 | Bolosky et al. | 713/189 |
| 2003/0056102 A1 * | 3/2003 | Aho et al. | 713/176 |
| 2003/0060247 A1 | 3/2003 | Goldberg et al. | |
| 2003/0195033 A1 * | 10/2003 | Gazdic et al. | 463/20 |
| 2004/0002383 A1 | 1/2004 | Lundy et al. | |
| 2004/0064457 A1 * | 4/2004 | Zimmer et al. | 707/100 |
| 2004/0142750 A1 | 7/2004 | Glisson et al. | |

FOREIGN PATENT DOCUMENTS

| | | |
|---|---|---|
| EP | 1 550 988 A2 | 7/2005 |
| WO | 02/01351 A2 | 1/2002 |
| WO | 2004/024260 | 3/2004 |

\* cited by examiner

| /config | /active.id<br>/boot.id<br>/public-key.id | ⎱ 302 |
|---|---|---|
| /os1 | /kernel.mfst<br>/initrd.mfst<br>/os.mfst | ⎱ 304 |
| /os2 | /kernel.mfst<br>/initrd.mfst<br>/os.mfst | ⎱ 306 |
| /games | /blazing7s.mfst<br>/black-and-white.mfst<br>/poker-library/mfst<br>/jacks-or-better.mfst<br>/dbl-dbl-bns-poker.mfst | ⎱ 308 |

FIG. 3

AUTHENTICATION SYSTEM FOR GAMING MACHINES

RELATED APPLICATION DATA

This application is a continuation-in-part of U.S. application Ser. No. 10/794,760, entitled GAMING SYSTEM ARCHITECTURE WITH MULTIPLE PROCESSES AND MEDIA STORAGE, filed Mar. 5, 2004, which claims the benefit of U.S. Provisional Application Ser. No. 60/452,407, entitled GAMING BOARD SET AND GAMING KERNEL FOR GAME CABINETS, filed Mar. 5, 2003, both of which are hereby incorporated by reference in their entirety.

FIELD OF THE INVENTION

An improved authentication system for gaming machines is provided. Specifically, provided is a system and method for verifying components of a computerized device, such as a gaming machine or other electronic device.

BACKGROUND OF THE INVENTION

In previous systems, authentication of content on read/write media or non-secured media storage involves calculating a hash value over the data contents and then using the hash value in conjunction with a digital signature and public key to verify that the data contents are authentic.

Typically there is a secure memory, or read only sealed memory, such as an EPROM which contains the authentication algorithm. Additionally there is non-secure media that contains the content to be authenticated. The secure memory can be removed and independently verified with external devices; however data in non-secure device cannot be easily removed and verification is more difficult. Therefore, it is desirable to have a program that is running from the secure memory authenticate the contents of the non-secure device.

The authentication methods usually involve calculating a hash value over the entire contents of non-secure media, or major portions thereof, at boot time. The problem with this method is that it takes a considerable amount of processing time to calculate a hash value over the entire contents of the non-secure media, especially if it is a hard drive, CD-ROM, or DVD-ROM that contains a large amount of data. This results in considerably longer boot times for gaming machines and other devices that require verification. For example, some boot times are as long as ten minutes or more. As gaming machines and other devices become more sophisticated, the storage requirements for the non-secure media is growing, resulting in even longer durations for boot time authentication.

Moreover, in many gaming jurisdictions, there are regulatory requirements that mandate that authentication of a system be performed by a program running from the secure media. For gaming machines based on personal computer (PC) architecture, this typically means that the BIOS must reside on the EPROM and the authentication code executed from the BIOS EPROM. This puts a further limitation on gaming machines because authentication code executing from the BIOS EPROM may not run as quickly as code executing from the faster PC-based RAM.

An alternative to the above method is to have the BIOS authenticate the operating system only, load the operating system, and then have the operating system authenticate the remainder of the non-secure media. However, this method still increases the boot time because the entire content of the non-secure media is authenticated by the operating system at boot time.

Additionally, regulatory gaming jurisdictions require that the contents of the non-secure media, and contents of programs executing from volatile memory, be checked on a periodic basis, or whenever significant events occur. For example, when a main door closes, the gaming machine must make sure that all code executing from RAM is authentic and that such code has not been modified. Some gaming machines have handled this requirement by re-authenticating the programs on the non-secure media and reloading them into RAM for execution. These requirements further contribute to significant delays that occur due to complying with authentication regulations.

Furthermore, it is possible to download data from a central host on the network to the non-secure media. It is desirable to have the ability to download individual files or groups of files to change the capabilities of the gaming machine. This may involve downloading a new game for use by the player or downloading some enhancement to the operating system files. Nevertheless, if there is just one digital signature for the entire contents of the non-secure media device, then updating small portions of the contents through downloading becomes more difficult because the host must also download the new digital signature. This means the host needs to re-sign the contents prior to download. Such a process has its drawbacks because the host may not be secure if it is in a casino location and not controlled by the gaming manufacturer that produced the code.

Accordingly, those skilled in the art have long recognized the need for a system and method to download individual files or groups of files, and to have each file or group of files independently authenticated from the rest of the files on the non-secure media on an "as-needed" basis. This invention clearly addresses these and other needs.

BRIEF SUMMARY OF THE INVENTION

According to one preferred embodiment, a means of quickly authenticating the contents of one or more manifests located on a writeable media device is disclosed. Once the contents of one or more manifests are authenticated, the boot process of the operating system is begun. The operating system then calculates a hash value over each component on the writeable media, as it is needed, and then compares it to a corresponding hash value located within the manifest to insure that the component has not changed. One benefit of this embodiment is that the digital signatures that are used for authentication are only calculated for the data located within the manifests, which are relatively small in size when compared to the entire data set of the writable media. Another benefit is that, for verification, a hash is performed on the components and compared to an associated manifest value, whereby the calculation of the hash is computationally less intensive than performing a digital signature check, as is preformed on the manifest.

According to another preferred embodiment, the components are verified on an as-needed basis, allowing for quicker boot times because only the components that are loaded are verified. This results in quicker system loading times, and through definition of the manifest components, better control over what components are verified and when they such components are verified.

Several methods of organizing the components are available. In one embodiment, a component is verified as or within partitions on the hard disk device. For example, in one preferred embodiment, the hard disk device contains multiple partitions containing, for example, the Linux operating system, gaming libraries and executables, and multiple games with each game being placed within a separate partition. During boot up, the manifest for the partitions is authenticated using DSA signature validation, and then each partition is verified when it is mounted or loaded by the operating system. Such verification is performed by calculating the hash value over the partition as it is mounted, and comparing it to the hash located within the manifest file. This allows the operating system to boot quickly because just the operating system is verified prior to loading the operating system. Then the libraries are verified and loaded. Only the games that are active need to have their respective partitions verified and loaded, although, optionally, several game files can be loaded at once for anticipated play. For example, and not by way of limitation, if a hard drive has 100 game partitions, but only 10 games are active, then only the 10 game partitions of the active games need to be verified at boot time.

In another preferred embodiment, components are broken down into files, where the manifest contains an entry for each file in the partition. During boot time, the BIOS verified the Linux kernel boot image, and loads it. The Linux kernel verifies each file as it is opened. The added benefit is that an entire partition does not need to be verified when it is mounted. Instead, the files in the partition are verified as they are opened. If the operating system only needs to load 20% of the files during boot time, then the remaining 80% of the files can be verified on an "as-needed" basis when they are loaded at a later time. This dramatically decreases the boot time for the gaming machine. Likewise, games are able to load just a portion of their graphic files during boot time. The remaining graphic files used for animated bonus screens, movies, and sounds can be loaded later as those resources are required throughout the game play cycle. In this regard, if a game contains 512 MB of graphics (by way of example only), 80% of which are sounds and movies, then the load time for the game is dramatically improved by delaying the loading of large files to support those sounds and movies.

Still, further methods of separation of the components to be verified are possible. For example, and not by way of limitation, games that play a 100 MB movie typically open the file and stream the content of the file to the display as the movie is being played. Therefore, it is not desirable to verify the entire file when it is opened, as there would be a significant delay when the movie file is opened for streaming. Therefore, another preferred embodiment allows files to be broken down into blocks of data where each block is verified as it is read from the media. For example, the manifest file may contain a file entry for a 100 MB file, where the file is broken down (by way of example, and not by way of limitation) into 4K block sizes where each block includes a corresponding hash value within the manifest file entry. As each block of the file is read, only that particular block needs to be verified before loading. This allows games to stream large sound and graphic files directly from the hard drive while simultaneously verifying the contents. The benefit is file verification without delays perceived by the player.

In another preferred embodiment, the breakdown of components is by sectors on the hard disk device. In this embodiment, each sector on the hard drive has a corresponding entry within the manifest. Since sectors are organized around the geometry of the hard drive, and not the file system, this embodiment results in a more efficient and simpler method of verifying information as it is loaded. For example, the Linux operating system has a block driver for a hard drive. When a block driver is instructed to load blocks of data for use by the file system, the block driver can read the sectors of the disk for the blocks of data and verify each sector as it is loaded. The benefit to this process is that sectors comprise continuous data on the hard drive organized around cylinders. Sectors are loaded very efficiently by the hard drive and thus can be efficiently verified using this mechanism. If an entire image is downloaded from a host server for a partition, each partition contains the files in a predefined organization. In one embodiment, a manifest for sectors is pre-calculated for the partition and downloaded along with the partition image.

In another preferred embodiment, when files are downloaded and installed by the gaming machine, the manifest is calculated dynamically by the gaming machine and stored in a writable area. Once the manifest is created based on any of the component breakdown methods described above, they are digitally signed by the gaming machine itself, or by a remote server. This allows for greater flexibility in how the component breakdowns are selected to achieve the greatest verification efficiency. For example, in one embodiment, downloaded files found in a partition allow the gaming machine to dynamically create a manifest based on hard drive sector verification that is digitally signed by the gaming machine, or by a remote host during manifest file creation. This embodiment provides individual file download capabilities, while maintaining the sector-based verification aspect, which may be the most efficient for the hard disk device in some embodiments.

In one preferred embodiment, a hard disk device contains a manifest partition, where the manifest files can be quickly located and authenticated. Alternatively, in another embodiment, the manifest files are contained in a predefined section of the hard drive reserved for quick loading and verification. In another embodiment, the entries of the manifest are spread out over the entire file system. For example, in one preferred embodiment, the hash value for a file is appended to each file, or in each file's directory entry. The digital signature is calculated over all, or logical groups, of the manifest entries spread out over the file system.

In one preferred embodiment, manifests are broken down to include entries for logical groupings of files. It is preferable in some gaming jurisdictions to have regulatory agencies approve groups of files as a package. For example, but not by way of limitation, in one embodiment, game files are broken down into several groups of files relating to: 1) paytable and win evaluation, 2) game executable code, 3) basic game graphics and sounds, and 4) paytable graphics and sounds. Each group of files is configured to be updated or replaced with a corresponding group of files. For example, to change the paytable, groups 1) and 4) are downloaded. Likewise, groups 2) and 3) are updated to change the look and feel of the game. Subsequently, as a particular group is downloaded, a corresponding manifest for the file group is also downloaded. This is referred to as a package. In one embodiment, a package can contain one or more manifests.

According to another preferred embodiment, a method verifies a gaming component. The method includes determining if a manifest is authentic, the manifest including component information and a stored hash for the gaming component; performing a hash calculation on the component to produce a calculated hash if the manifest is authenticated; verifying the gaming component by comparing the calculated hash to the stored hash; and loading the gaming component if the calculated hash and the stored hash are equal.

In one preferred embodiment, the component comprises a data file. In another preferred embodiment, the component comprises a data component stored in a partition of a digital storage medium. In this embodiment, the stored hash is a hash of the entire partition, and performing the hash calculation includes performing the hash calculation on the entire partition if the partition has not yet been verified during operation of the device.

In yet another preferred embodiment, the component comprises a data component stored in a library located on a digital storage medium. In this embodiment, the stored hash is a hash of the entire library. The performing of the hash calculation comprises performing the hash calculation on the entire library if the library has not yet been verified during operation of the device.

Yet another preferred embodiment includes a method of verifying one or more components in a device. The method includes determining if a manifest is authentic, the manifest including component information and a stored hash for each component; performing a hash calculation on each component as each component is needed for operation of the device to produce a calculated hash for each component if the manifest is authenticated; comparing the calculated hash to the stored hash for each component; for each component needed for operation of the device, loading the component if the calculated hash and the stored hash are equal.

In another preferred embodiment, a method verifies a component, wherein the component has a plurality of sub-components. The method includes determining if a manifest is authentic, the manifest including sub-component information and a stored hash for each sub-component; performing a hash calculation on at least one sub-component to produce a calculated hash if the manifest is authenticated; verifying the at least one sub-component by comparing the calculated hash to the stored hash for the sub-component; and loading the sub-component if the calculated hash and the stored hash for the sub-component are equal.

In yet another preferred embodiment, a system is used to verify a component. The system includes a processor, and a set of instructions that are executable on the processor for authenticating a manifest, wherein the manifest includes component information and a stored hash for the component. Included is a set of instructions that are executable on the processor for determining if the manifest is authenticated. Further included is a set of instructions executable on the processor for performing a hash calculation on the component to produce a calculated hash if the manifest is authenticated. A further set of instructions is executable on the processor for verifying the component by comparing the calculated hash to the stored hash. A further set of instructions that is executable on the processor is included for loading the component if the calculated hash and the stored hash are equal.

In another preferred embodiment, a system for verifying a component includes a computer usable medium having computer readable program code embodied therein configured for verifying a component. Computer readable code configured to determine if a manifest is authentic is included. The manifest includes component information and a stored hash for the component. Further computer readable code is configured to perform a hash calculation on the component to produce a calculated hash if the manifest is authenticated. Further computer readable code is configured to verify the component by comparing the calculated hash to the stored hash. Further computer readable code is configured to load the component if the calculated hash and the stored hash are equal.

In another preferred embodiment, a method verifies one or more files stored on a network associated storage device connected to a network. The method includes determining if a manifest is authentic, the manifest including component information and a stored hash for a file; reading the file from the network associated storage device over a network connection if the manifest is authentic; performing a hash calculation on the file to produce a calculated hash; verifying the file by comparing the calculated hash to the stored hash; and loading the file if the calculated hash and the stored hash are equal. In one aspect of this embodiment, the gaming machine uses a plurality of files stored on the network associated storage device, reading the file, performing the hash calculation, verifying the file, and loading the file are performed for each file, as needed. In another aspect of this embodiment, verifying the file includes performing a SHA-1 verification. In another aspect of this embodiment, the network associated storage device comprises a network attached storage device.

In another preferred embodiment, a method verifies one or more files stored on a diskless storage device. The method includes determining if a manifest is authentic, the manifest including component information and a stored hash for a file; reading the file from the diskless storage device if the manifest is authentic; performing a hash calculation on the file to produce a calculated hash; verifying the file by comparing the calculated hash to the stored hash; and loading the file if the calculated hash and the stored hash are equal. In one preferred embodiment, the diskless storage device comprises a solid-state storage device. In another preferred embodiment, the solid-state storage device comprises an erasable programmable read-only memory. In another preferred embodiment, the solid-state storage device comprises a safe random access memory.

Other features and advantages of the claimed invention will become apparent from the following detailed description when taken in conjunction with the accompanying drawings, which illustrate, by way of example, the features of the claimed invention.

BRIEF DESCRIPTION OF THE DRAWINGS

FIG. 3 is a block diagram that illustrates directory and file organization of a partition for manifests on the hard disk device of FIG. 2;

DETAILED DESCRIPTION OF THE PREFERRED EMBODIMENTS

In one embodiment, a system and method that uses digital signature technology to authenticate the contents of one or more manifests on a digital storage device is provided. Each manifest includes a list of file records, wherein each record contains the name of a file stored on the hard disk device, and a hash value derived from the contents of the file of a device. At boot time, the gaming machine first authenticates the contents of the manifest and then verifies the contents of the files using the hash value stored in the manifest. By way of example, but not by way of limitation, files are verified using a SHA1 as they are needed during the boot up of the operating system and throughout normal operation. This method reduces the boot time of, for example, of a gaming machine and eliminates the need to check digital signatures for each individual file or over the entire contents of a non-secure media.

Figure 1:
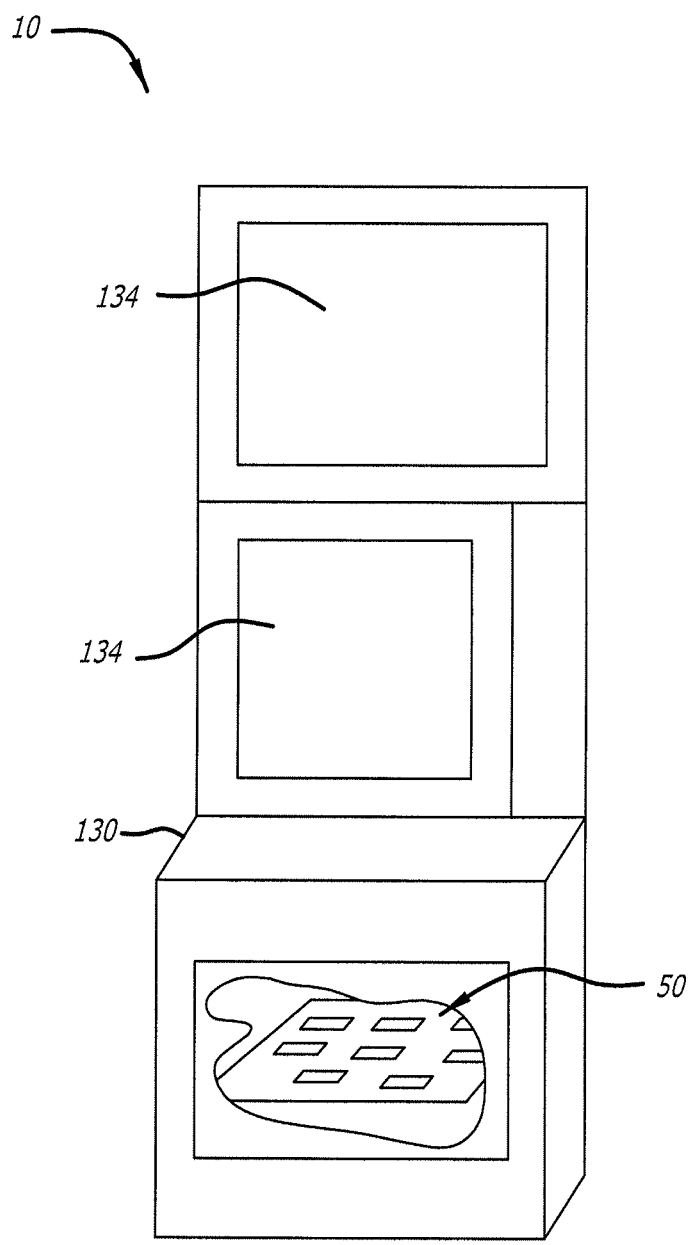
FIG. 1 is a block diagram that illustrates a device that comprises a gaming machine having components capable of verification according to one embodiment.

Referring now to the drawings, wherein like references numerals denote like or corresponding parts throughout the drawings and, more particularly, to FIGS. 1-6, there is shown one embodiment of an improved authentication system in accordance with the invention. With reference to FIG. 1, a block diagram illustrates a device 10 that comprises a gaming machine 10. A cabinet 130 houses the gaming machine 10 that has one or more CRT-type displays 134 for displaying game play. Electronic components 50 that operate the games on the gaming machine 10 are located within the cabinet 130.

Figure 2:
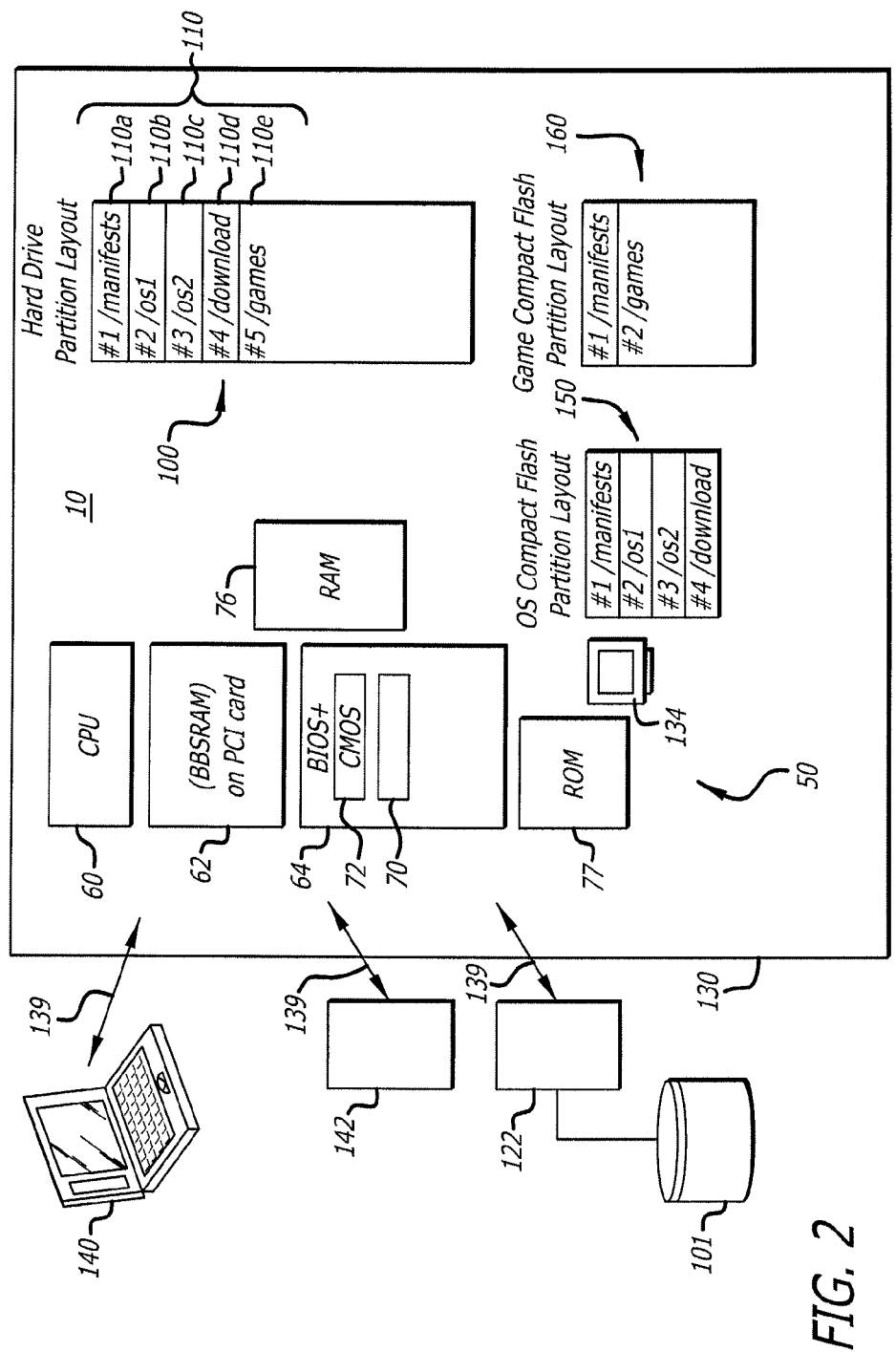
FIG. 2 is a block diagram that illustrates components of the gaming machine of FIG. 1.

With reference to FIG. 2, a block diagram illustrates components 50 of the gaming machine 10 capable of verification before and during use of the gaming machine 10. The components 50 comprise, for example, and not by way of limitation, software or data file components, firmware components, hardware components, or structural components of the gaming machine 10. These components include, without limitation, one or more processors 60, a hard disk device 100, volatile storage media such as random access memories (RAMs) 76, read-only memories (ROMs) 77 or electrically erasable programmable ROMs (EEPROMS) such as basic input/output systems (BIOS) 64.

In one embodiment, components 50 also include data files (which are any collections of data, including executable programs in binary or script form, and the information those programs operate upon), gaming machine cabinets (housings) 130, cathode ray tubes (CRTs) 134, or compact disk read only memory (CDROM) or CD read-write (CR-RW) storage. In one embodiment, the data files may include data storage files, software program files, operating system files, and file allocation tables or structures. Ports 139 are be included with the gaming machine 10 for connection to diagnostic systems 140 and other input/output devices 142. In one embodiment, the ports 139 each comprise a serial port, universal serial bus (USB) port, parallel port or any other type of known port, including a wireless port. Preferably, each of the components 50 have embedded or loaded in them identification numbers or strings that can be accessed by the processor 60, including the processor 60 itself, which are utilized for verification as explained below. In embodiment, the components that are data files each use their file path and name as their identification number or string.

Either within the gaming machine 10, or in the diagnostic system 140 attachable to the gaming machine 10, are executable instructions or a software program 70 for verification of the components (verification software 70), which may itself be one of the components 50 to verify if it is internal to the gaming machine 10. In one embodiment, verification software 70 is stored on a persistent storage media such as the hard disk device 90, ROM 77, EEPROM 64, in a complementary metal oxide semiconductor memory (CMOS) 72, in safe ram comprising a battery-backed static random access memory (BBRAM) 62, in flash memory components 150, 160, or other type of persistent memory. In one embodiment, the verification software 70 is stored in a basic input/output system (BIOS) 64 device or chip. BIOS chips 64 have been used for storing prior verification software, such as previous versions of the BIOS+ chip used by Bally Gaming Systems, Inc. of Las Vegas, Nev. in their EVO gaming system. Placing the verification software 70 in the BIOS 64 is advantages because the code in the BIOS 64 is usually the first code executed upon boot or start-up of the gaming machine 10, making it hard to bypass the verification process. Alternatively, in one embodiment, the verification software 70 is stored in a firmware hub (FWH), such as Intel's 82802 FWH.

The organization of the hard disk device 100, and compact flash 150 and 160 for the operating system and game according to one embodiment are shown. The hard disk device 100 is broken down into partitions 110 to reserve a fixed amount of space for major components of the gaming system. When a hard disk device 100 is used as the mass storage media, all content is downloaded to the hard disk device 100 and there is typically no need for compact flash components 150, 160. However, in one embodiment, a hard disk drive 100 is used in combination with a game compact flash 160 containing game files, such files being previously approved by a regulatory agency. Preferably, in a completely downloadable system, the hard disk device 100 contains all files for the system and the game compact flash storage media 160 is not required. For jurisdictions that don't allow for hard disk devices, the operating system's compact flash 150 is used to hold the Linux operating system and gaming operating system related files, and the game compact flash 160 holds the game files.

Each storage media, including the hard disk device 100, and flash memories 150 and 160, is formatted into a typical disk drive geometry of sectors, cylinders and heads. Sector 0 of the storage media contains the master boot record, which also contains a partition table. In one embodiment, a /manifests partition 110a is an EXT2 Linux file system that is designed to hold the manifest files that are associated with other files stored on the remaining media partitions.

An /os1 partition 110b holds the root file system for the operating system that is mounted by a Linux kernel. The root file system contains the Linux operating system files as well as other utility files of the gaming machine that are needed for proper operation. It also contains the files that pertain to the operation of the gaming OS. These are programs specifically developed to manage the resources that are common to gaming machines, such as input/output (I/O), peripherals, random number generator(s), host communications drivers, and the like.

An /os2 partition 110c holds the same type of files as the /os1 partition 110b, but the /os2 partition 110c includes an alternative operating system that can be executed. If for some reason the operating system contained in the /os1 partition 110b fails to load and properly execute, then the system can revert to the operating system in the /os2 partition 110c as a backup operating system. In one embodiment, the /os2 partition 110c holds an operating system that was previously known to operate without failure. The operating systems contained in the /os1 and /os2 partitions 110b, 110c can be used interchangeably in an alternating fashion so that it can be guaranteed that the last known, acceptable operating system can be executed if the other operating system fails to load. Another advantage of these dual operating system partitions is to allow for robust updates of the operating system, even if a power-fail should occur during package installation. This is particularly important for various remote system locations, where it may be inconvenient to send technicians to fix failed downloaded updates.

In another embodiment, a /download partition 110d holds a writable partition where newly downloaded packages are stored and download log files are kept. When a package is installed, the package contents are used to update files on the hard-drive partitions as dictated by the package contents.

In a still further embodiment, a /games partition 110e holds the files related to a game application. This includes the game executable, graphics, sounds, paytables, configuration and other files required for the game application to operate properly. In one embodiment, this partition holds files for a plurality of games and their associated files. This allows the system to support multigame applications.

The operating system's compact flash 150 layout is similar to the hard disk device 100 layout, except, in some embodiments, it does not contain a /games partition. The game compact flash 160 contains a /manifest partition and /game partition. The operating system compact flash 150 is used along with the game flash 160 to form a complete bootable system. The /manifests partition located on each media 160 contains the manifest files associated with their respective media partitions.

As alternative, instead of, or in conjunction with, the hard disk device 100, another mass storage device is used, such as a CD-ROM, CD-RW device, a WORM device, a floppy disk device, a removable type of hard disk device, a ZIP disk device, a JAZZ disk device, a DVD device, a removable flash memory device, or a hard card type of hard disk device.

FIG. 3 is a block diagram that illustrates directory and file organization of the /manifest 110*a* partition for a hard disk device 100. As shown in FIGS. 2 and 3, a /config directory 302 contains configuration files that the BIOS can use during the boot process, including known operating system boot tracking files boot.id and active.id. In one embodiment, a publickey.id file stores a public key for verifying the /config directory itself, or the whole manifest partition as a component. The /os1 directory 304 contains the manifest files pertaining to the operating system in /os1 partition 110*b*. The /os2 directory 306 contains manifest files for the operating system in the /os2 partition 110*c*. The /games directory 308 contains all manifest files for the /games partition 110*e*. In one embodiment, manifest files end in ".mfst" which allows the BIOS to uniquely identify them as it parses through the file system.

Still further, a "/os1/kernel.mfst" manifest file contains an entry associated with the Linux kernel image that is stored on the /os1 partition 110*b* at the location "/boot/kernel.image". Likewise the "/os1/initrd.mfst" manifest file contains an entry associated with the /os1 partition file at the location "/boot/initrd.image" The "/os1/os.mfst" file contains entries for all other files on the /os1 partition 110*b*.

Figure 4:
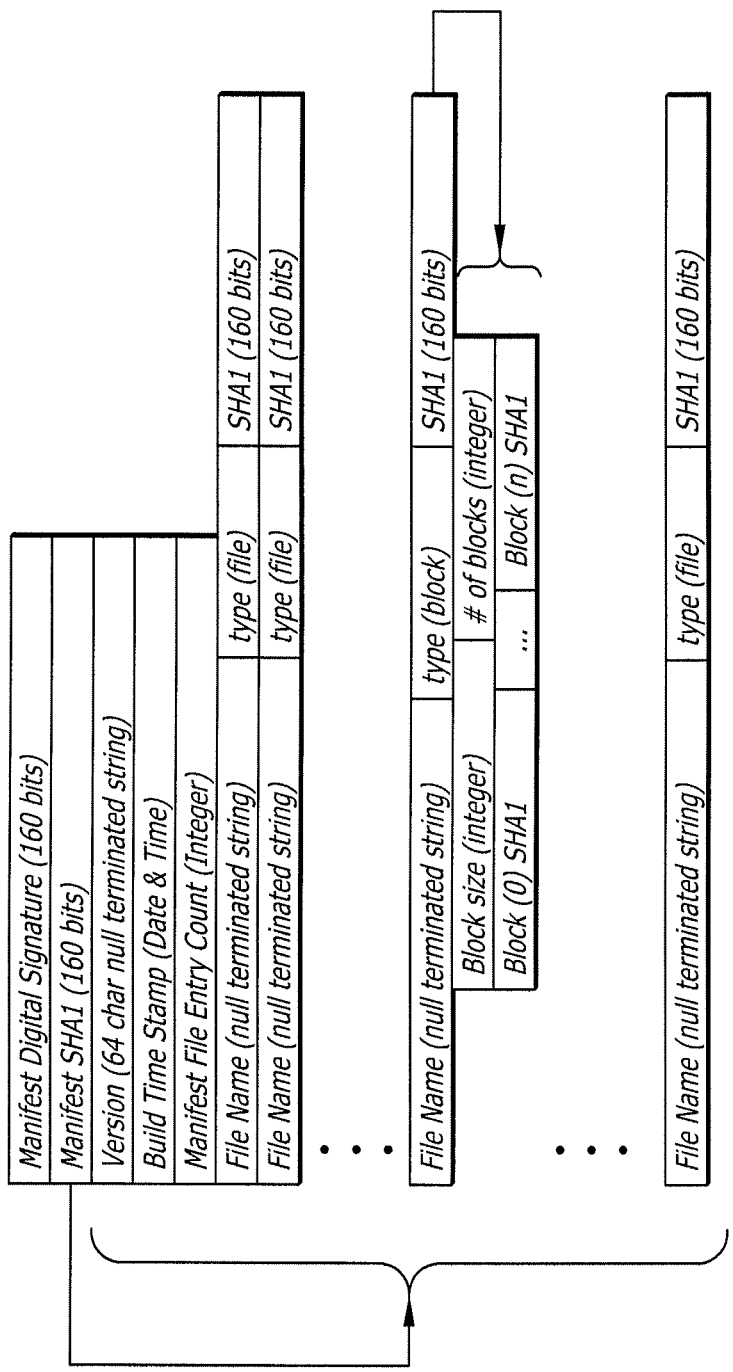
FIG. 4 is a bock diagram illustrating a structural organization of a manifest file according to one embodiment.

FIG. 4 is a block diagram that illustrates the layout of a manifest file according to one embodiment. The manifest file contains header information followed by an entry for each file. The first component is the Manifest Digital Signature (MDS). The digital signature is created at a later time after the manifest is created. During manifest creation, the MDS is initially filled with zeros as a placeholder. The next field is the SHA1 hash value. This hash value is calculated over the remainder of the manifest file data. The next field holds the version string of the manifest. Each manifest is uniquely identified by its file name. However, additional version information is also placed within the file. The Build Time Stamp field (BTS) contains the date and time when the manifest was created. In one embodiment, the date and time field is in Unix format. The Manifest File Entry Count (MFEC) field contains the number of file entries that directly follow this field.

Each file entry contains information to allow the Linux kernel to verify the contents of a file that exists on one of the partitions. The first field of the file entry is the name of the file. The file name is a variable length string that is terminated by a null character. The name of the file matches the path of the file to which it refers, as it exists on the Linux file system. For example, and not by way of limitation, a file in a game partition with the relative path, "/blazing7s/paytable," relates to an entry of "/games/blazing7s/paytable" in the manifest because the game partition is mounted under the "/games" directory of the Linux file system.

Following the file name field is the type field, which stores the type of the referred file. The type can be "file" to indicate the SHA1 is over the entire file contents. In another embodiment, the type field can be set to "block" to indicate that the file data is broken down into blocks of hashed data. Following the type field is a summary SHA1 hash value that is computed over the remainder of the record's data. The block size field that follows indicates the size of each block of file data. The number of blocks in the file is the next field and it denotes how many SHA1 hash values will follow. The remaining SHA1 hash values in the file entry are the SHA1 values for each sequential block of data of the file. The last SHA1 in the list includes the hash value over the last block of file data. This last block could be less than the full block size in the event the file size is not an exact multiple of the block size.

The benefit of block type verification is that it allows each block of data to be verified as the content of the file is being read. For example, a media file may consist of a file size of 310,000,000 bytes, which is approximately 302 Mbytes in size. Loading this entire file into memory may be difficult or impractical for embedded systems having limited memory. Therefore, it is desirable to stream the media file to the video display and sound system by loading one piece of data at a time. Additionally, verifying the entire 302 Mbyte file before playing it, may cause the system to present a significant delay to the player. By using a block size of 4 Kbytes, for example, each block is read and the contents are verified one block at a time. This results in the 302 Mbyte file having 75684 blocks and 75684 SHA1 values stored in the manifest file. The last block of data in the file contains the remaining 2432 bytes of data of the file and the last SHA1 in the SHA1 list is calculated for this last block of 2432 bytes of data.

Figure 5:
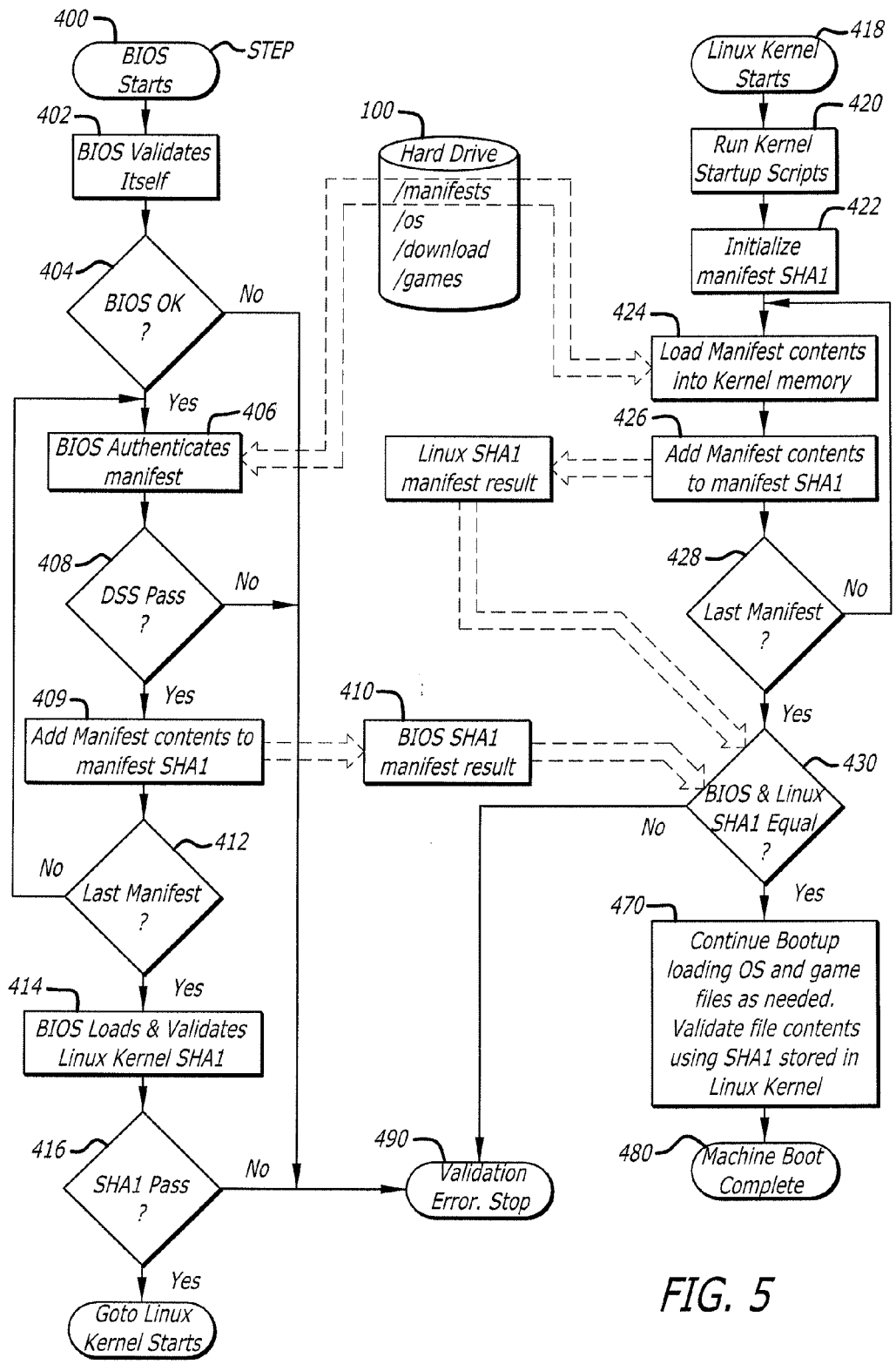
FIG. 5, there is shown a flow chart illustrating the steps for booting a BIOS and Linux operating system according to one embodiment.

FIG. 5, there is shown a flow chart illustrating the steps for booting a BIOS and Linux operating system according to one embodiment. The BIOS is the first program to start when the gaming machine is powered on. The BIOS is located in a 1 MByte EPROM. Of course, it will be appreciated that EPROMs of other capacities may also be used. The last 512 Kbytes of the EPROM includes the BIOS code. The first 512 Kbytes is used as startup code.

The BIOS first executes on power-up, step 400. In one embodiment, the BIOS initializes PC-based hardware and then executes a BIOS extension prior to booting from media. The BIOS extension generally resides in the lower half of the EPROM. In step 402, the BIOS extension first validates itself by calculating a Standard Hashing Algorithm 1 (SHA1) over the entire 1 MByte BIOS EPROM. In step 404, if the calculated SHA1 does not match the stored SHA1 in the BIOS, then the EPROM is deem corrupt and execution stops at the validation error state, step 490. The validation error state displays a meaningful error message to an operator and prevents further booting of the gaming machine system. The gaming machine remains in this unplayable, faulted state until power is recycled or the device is turned off and on. Again, a SHA1 is preferred, but other techniques may also be used as are well know in the art.

The BIOS validation step 402 may also include the check of a digital signature. The digital signature and public key may be stored in the BIOS next to where the SHA1 is stored. After the SHA1 passes, the digital signature, public key, and SHA1 value can be used by a digital signature algorithm to test the authenticity of the BIOS.

After the BIOS has authenticated the BIOS EPROM, in step 406, the BIOS authenticates the manifests on the media storage devices attached to the gaming system electronics. During initial boot-up, the BIOS searches for IDE drives connected to the electronics. One preferred configuration includes one large capacity hard drive, although other configurations are used with other embodiments. For example, with reference back to FIG. 2, in one embodiment, the media storage device storing the files to be verified and used by the gaming machine 10 is a remote media storage device 101, that is accessed over a port 139 configured as a network connection (e.g., RJ 45 for TCP/IP network, USB, switched fabric connection, or the like) to a download server 122. The files are read from the remote storage device over the network connection port 139 from the download server 122.

In another embodiment, the remote media storage device 101 is combined with the download server 122 in a specialized file server called a network file storage device. A network file storage device contains a slimmed-down operating system and a file system. The operating system processes I/O requests by supporting common file sharing protocols. In one embodiment, this allows the gaming machine 10 to operate as a diskless workstation, and boot directly from the remote media storage device 101.

In yet another embodiment, the media storage device storing the files to be verified and used by the gaming machine is a solid state, or diskless, storage device, such as an erasable programmable ROM (EEPROM), safe random access memory (safe-RAM), another flash memory device, or the like.

Whether remote or local, hard disk or solid state, for each media storage device, the BIOS reads the manifests. In one embodiment, the manifests are read from a first partition 110 located on a hard disk device 100. In this embodiment, since the manifests are stored in a EXT2 Linux file system on the partition 110, the BIOS is programmed to read this file system so that it can open the root directory, subdirectories, and files within the subdirectories. The BIOS starts at the root directory for the manifest partition 110a and performs a depth first recursive search for all manifest files that have the ".mfst" suffix. Every manifest file found is then authenticated by the BIOS.

In one embodiment, for each manifest file, the system first reads the size of the file from the directory entry. Then, in step 406, the BIOS opens the file to read the file contents in binary format. The first 20 bytes of data are read as the digital signature for the manifest. The next 20 bytes are read as the pre-calculated SHA1 representing the entire remaining file contents. The BIOS then reads the remaining contents of the file and calculates a SHA1 over those remaining contents. The pre-calculated SHA1 and the calculated SHA1 then are compared. If they are not equal values, then the BIOS provides a validation error and stops. Next, in step 406, the BIOS uses the SHA1 value, the digital signature for the manifest, and the public key stored in the BIOS to authenticate the manifest file using a digital signature algorithm (DSA). In step 408, if the DSA passes, then the manifest is considered authentic; otherwise the BIOS provides a validation error and stops, step 490. The manifest being authenticated need not be loaded into memory. In one embodiment, it is read in a piecemeal manner so that the SHA1 can be calculated over the file contents. Once a manifest is authenticated, then its contents are cleared from memory. The BIOS then proceeds to authenticate the next manifest.

Additionally, when authenticating manifest files, the BIOS keeps a running SHA1 hash value over all manifest file data it processes in a global variable 410. Initially, this global variable, BIOS SHA1, is set to zero. As each manifest is authenticated, the BIOS uses the BIOS SHA1 result to perform a running calculation over the entire manifest file contents. The BIOS then stores the new BIOS SHA1 result back in the global variable, step 409. This process is similar to a process of calculating a SHA1 over all manifest files as if they were all concatenated into a stream of file data. Therefore, the order of processed manifests is kept consistent between the BIOS and the kernel.

The BIOS SHA1 value is then passed to the Linux kernel when it boots, step 418. The Linux kernel can use it to guarantee that the manifest file contents are identical when the Linux kernel loads the manifests into memory. This allows the BIOS to perform all of the authentication from EPROM based code, but allows the Linux kernel to verify that every file loaded thereafter has not changed from its originally processed contents. This step guarantees that the manifest files have not been changed between the time the BIOS authenticates them and the time the Linux kernel loads them. In an alternative embodiment, the BIOS system continually accesses the hard disk device 100 for the manifests. With constant accesses and a quick boot time, the system can reduce the chance that the manifest file has changed.

Once all manifests are authenticated, step 412, then the BIOS verifies the Linux kernel image and the initial ram disk image, step 414. The Linux kernel image contains the compressed binary image for the Linux kernel. This is the first part of the Linux operating system that runs. The initial ram disk image contains a ram based file system that holds the startup drivers and startup scripts used by the Linux kernel image. In one embodiment, the manifest partition contains two special manifest files that can be identified by their file name. The /manifests/os1/kernel.mfst file contains the SHA1 for the kernel image and the /manifests/initrd.mfst contains the SHA1 for the initial ram disk image. When authenticating these two manifest files, the BIOS saves their embedded SHA1 values to use when loading the Linux kernel image and the initial ram disk image. In step 414, the Linux kernel image is loaded into memory by the BIOS. As it is loaded, the BIOS calculates a SHA1 over the contents. Once loaded, in step 416, the BIOS compares the calculated SHA1 to the SHA1 kept from the manifest file, kernel.mfst. If they are the same, then the Linux kernel image is verified. The BIOS performs the same type of operation on the Linux initial ram disk image. If either of the SHA1 comparisons fail, the BIOS produces a validation error and halts further booting, step 490. Once both images are loaded, the BIOS jumps to the start of the Linux kernel image in memory, step 418, passing the BIOS SHA1 manifest calculation it computed over all manifest files found on all media devices, step 410. This value is passed in as a startup value allowing Linux to use it later in the boot process.

When the Linux kernel executes, it performs some initialization, eventually mounts the initial ram disk image, and runs the startup scripts found on the initial ram disk, step 420. These startup scripts load certain drivers from the ram disk and install them into the Linux kernel. One of these drivers is the file verification module. This module intercepts file open calls made to the Linux kernel so that a file can be verified immediately upon opening and before use. The module is also responsible for storing the manifest entries of file names and SHA1 values to use in file verification. After installing the file verification module, the startup scripts run the manifest loader that loads the manifests into the kernel file verification module, step 422.

The manifest loader begins searching for manifest files on the media devices. In one embodiment, the search for manifests is performed using the same method and order as did the BIOS. Similar to the BIOS, the manifest loader contains a global variable, Linux SHA1, that it initializes to zero, step 422. As each manifest file is loaded, step 424, the SHA1 is calculated over the entire manifest file contents. In step 426, each manifest is parsed based on the manifest file version, type information, and file type version information. The manifest loader parses out each file entry record. For each file entry it calls, the Linux kernel file verification module passes the file name, file type, file SHA1, and any extra data associated with the file types, such a block list of SHA1s. As each call is made to load a manifest entry, the file verification module adds each entry into an internal memory table protected by the kernel and that is inaccessible to other processes, step 424, until the last manifest is processed, step 428. This table is preferably a hash table keyed on file names to allow for quick lookups when a file is opened. It is possible for two manifests to reference the same file, but they both preferably contain the same SHA1 value. In other words, duplicate entries are accepted and filtered out by the file verification module. In one embodiment, if the same file name is loaded into the kernel file verification module and the file has two different SHA1 values, then such is considered a validation error and the boot process is terminated.

Once the manifest loader has loaded all manifests from all media devices, it then passes into the file verification module the Linux SHA1 value it computed over all manifest file data. In step 430, the Linux kernel compares the BIOS SHA1 passed to it when starting the Linux kernel to the Linux SHA1 passed in by the manifest loader. If they are identical, then all manifests that have been authenticated by the BIOS have been loaded by the manifest loader and all manifest data was identical in both operations. In this case, the file verification module records that it has been properly initialized and the kernel call returns to the manifest loader to continue the boot process. If a mismatch between the BIOS SHA1 and Linux SHA1 is found in step 430, then the kernel goes into a file validation error mode and prevents further execution of the boot process in step 490.

During the boot process, startup scripts for the system continue to run, step 470. Each of these files is loaded and verified by the Linux kernel verification module by comparing its calculated SHA1 value to the SHA1 value loaded in step 424. Eventually the root file system for the operating system is mounted from the hard disk device. In one embodiment, it is mounted as a read-only file system. This file system contains more startup scripts to continue the initialization of the operating system and the eventual loading of the gaming operating system libraries, servers, and game applications that comprise the gaming system, step 480.

Figure 6:
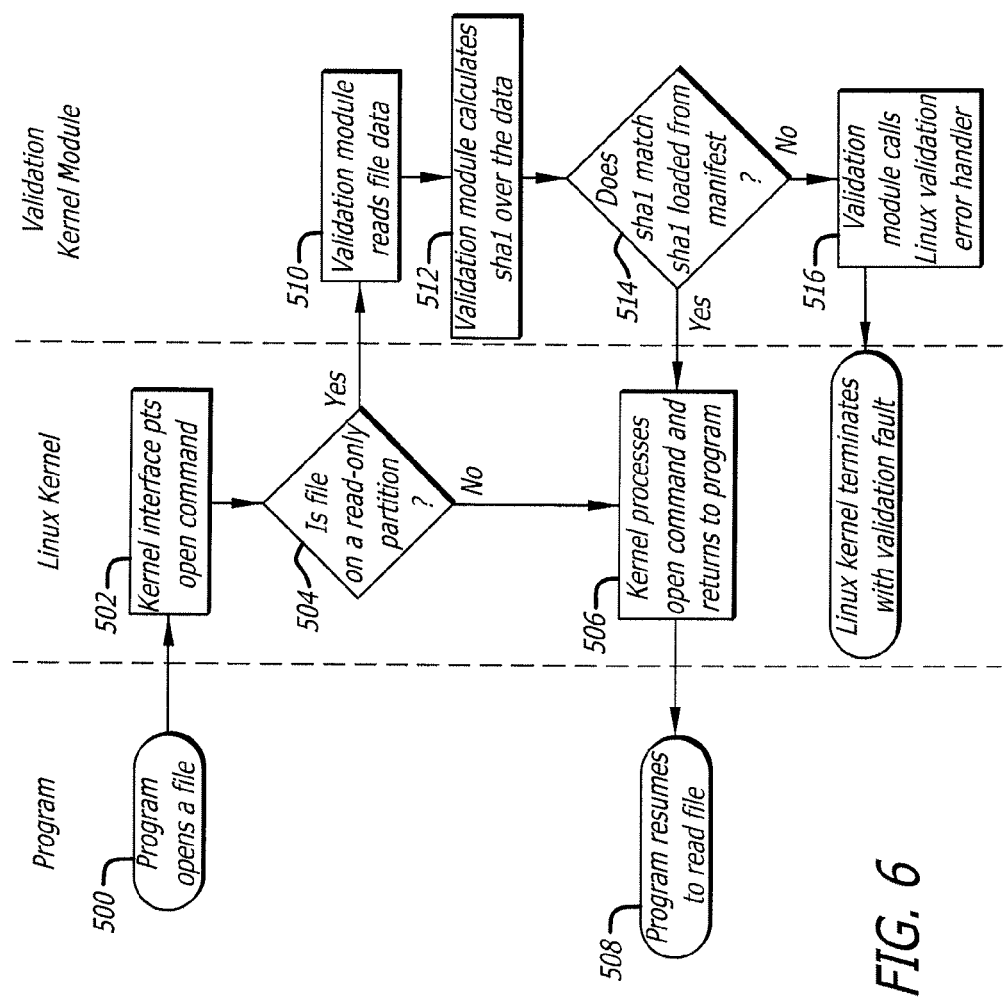
FIG. 6 is a flow diagram that illustrates the steps performed in a file verification method when a file is opened, according to one embodiment.

FIG. 6 is a flow diagram that illustrates the steps performed in file verification method when a file is opened, according to one embodiment. As each file is opened for processing, step 500, a standard file-open call is made to the Linux kernel, step 502. This can be caused by a script opening a file, a program opening a file, or a Linux library opening a file. Every file-open call is intercepted. In one embodiment, the Linux kernel is customized to check if the file is on a read-only partition, step 504, and if not, a function call is made through an indirect pointer to the file verification kernel module. Otherwise, the file does not need verification and the Linux kernel can open, step 506, and process, step 508, the file as it normally does.

More particularly, the kernel file verification module receives the call to verify a file, step 510. The system first looks up the file's complete path name in the hash lookup table loaded previously during the Linux boot process. In one embodiment, if the file entry is not found, then this unknown file cannot be verified and the Linux kernel goes into a file validation error mode, and prevents further execution of any applications. If the file is found, then it retrieves the SHA1 value loaded for that file entry. The file data is then read by the kernel file verification module and a SHA1 is calculated over the file contents, step 512. The SHA1 calculated over the file contents is then compared to the manifest SHA1 value retrieved from the hash table, step 514. If they match, then the file verification module returns to the Linux kernel allowing it to complete the normal file open process, step 506. If there is a mismatch, then the Linux kernel goes into the file validation error mode preventing further execution of any application processes, step 516.

In another embodiment, referring to the previous example of a 302 Mbyte file with "block" type validation, in an additional effort to save memory in the embedded system, the entire SHA1 list for file-by-file type verification of files is not loaded at boot time. To save time, the Linux kernel retains in memory where the SHA1 list of the 75684 SHA1 values starts in the manifest file and uses it at a later time when the file is opened for streaming. When the file is opened, the Linux kernel reads the SHA1 list from the manifest. In order to insure that the list has not changed or been corrupted, the first SHA1 in the file entry is the SHA1 hash value for the list. The Linux kernel can then load the list and check its SHA1 against the SHA1 originally loaded at boot time. Once this test is passed, then the file is ready for streaming and each block of file data can be checked as it is loaded.

In one embodiment, a more hierarchical organization of SHA 1 values is used. This organization allows the Linux kernel to load one piece of the SHA1 value list at a time to further reduce any load or time delays. If the Linux kernel loads 1000 SHA1 list values at a time, then a second tier level of 75 SHA1 values are present. The first SHA1 is computed over the 75 SHA1 values. The first SHA1 value in the second tier list is then computed over the first 1000 SHA1 values of the 3rd tier.

By using different types of file entries as denoted by the type field, the manifest can support many different authentication methods. The BIOS does not need to retain information about the format for these types of manifests. The BIOS searches for manifest files ending in the ".mfst" extension, reads the contents, calculates the SHA1 over the manifest file contents, excluding the first 40 bytes of the DSS and the SHA1 values, and then compares the SHA1 to what is stored in the manifest file. If there is a mismatch, then the manifest file is corrupt. If the SHA1 values match, then the digital signature is checked with the SHA1 value. If the digital signature passes, then the manifest is deemed authentic. If not, then there is a file validation error.

In other embodiments, the manifest is signed with other public/private key algorithms, such as RSA, without affecting the benefit that the digitally signed manifests provide. In one embodiment, the manifests are encrypted instead of being digitally signed. In yet another embodiment, the Linux Kernel Image and initial ram disk image are encrypted. The decryption key is stored in the BIOS. The BIOS decrypts the Linux kernel image and the initial ram disk image, and allows the Linux kernel to boot. By decrypting the kernel, the BIOS can run the kernel as a trusted program. The Linux kernel boots and the startup scripts run the manifest loader. The manifest loader decrypts the manifest files and loads the file entries into the Linux kernel file verification module, as described above. Once all manifests are loaded, the Linux operating system continues booting and dynamically checks the validity of each file as it is opened.

In another embodiment, manifests may be broken down to hold SHA1's for files according to how software components are packaged and distributed. A package may consist of a set of files and the package manifest that controls or pertains to one aspect of the gaming machine's operation. By breaking the operating system or game files into smaller packages, a gaming system that supports download can have better control over which packages get updated when such update occurs.

In some embodiments, one manifest holds verification data for every file on the hard drive, while in other embodiments, the manifest is limited to only one file, wherein every file has its own associated manifest. Neither of these methods diminish the benefit of improving the boot speed, since the operating system verifies files that are loaded on an "as-needed" basis.

In another embodiment, one manifest with one digital signature is used for all data files on a gaming platform, or for a particular media storage device. In this embodiment, the manifest partition contains one manifest file and one digital signature. In another similar embodiment, the manifest partition is a list of files and their associated SHA1 values, with a digital signature at the end of the partition, so that the entire partition is authenticated before loading.

The benefit to having one manifest is the simplicity of managing only one file entry list or one manifest, and the speed at which the manifest is processed. In some embodiments, the manifest is created at the time software is built for release. However, downloading one entire package to the hard drive along with its one associated manifest is not quite as beneficial as downloading individual packages, in some gaming jurisdictions. In these gaming jurisdictions, individual packages are created and approved by regulatory agencies in an independent manner. In gaming machines located within these jurisdictions, the packages are downloaded to gaming machines individually by a download server to form various configurations. This is much easier to manage instead of creating every configuration at the time the software is built and getting every combination of configuration approved by regulatory agencies. For these gaming machines, it is advantageous to include a manifest in or for each package downloaded.

In one embodiment, a method allows a single manifest to exist while still providing the ability to download individual packages. In this embodiment, the manifest is dynamically signed each time a new download occurs that affects the contents of the manifest. If a new package is downloaded that contains four new files and one changed file, then four manifest file entries are added and one entry updated with the new SHA1 corresponding to the files. The gaming machine digitally signs the manifest after the download installation is completed. In this embodiment, the private key for digitally signing the manifest is located somewhere within the gaming machine.

In an alternative embodiment, the gaming machine, through a secure connection with a download host, sends the manifest information to the download host and the download host dynamically digitally signs the manifest and responds to the gaming machine with the manifest digital signature. In another embodiment, the host already has the manifest contents of the gaming machine and is able to digitally sign the new manifest and download it with the original download package. Either of these methods allows the download server to digitally sign the manifest so that the private key is not stored within the gaming machine. This added protection of the private key can be more easily performed on the download server and is more economical than placing the same protection on every gaming machine. Such protection can involve, for example, a secure computing system, chip, or plug-in board that provides digital signatures without compromising the private key.

As described above, the manifest contains file entries and their associated SHA1 values. In an alternative embodiment, the manifest contains a list of partition entries that are on the storage media. Each partition entry indicates a partition on the hard drive and its corresponding SHA1 value. The Linux kernel and the initial ram disk image are stored in a separate partition. The BIOS authenticates the manifest via its digital signature. It then verifies the Linux kernel partition by calculating a SHA1 over the partition data, and then compares it to the manifest partition entry. Once verified, the BIOS loads the Linux kernel and the Linux kernel boot process begins. The manifest loader loads the manifest in the Linux kernel partition verification module. The partition verification module is responsible for verifying each partition as it is mounted by the Linux operating system. Partitions are larger than files, and verifying a partition prior to using some of the files in the partition may take a little longer than file based verification; however, it is still faster than verifying the entire media content prior to booting.

Another embodiment uses block-based verifying. Every fast access storage media in Linux is broken down into block-based accesses. Each block may be 512 bytes in size. Of course, any size block can be used. File systems are organizations that are built on top of the block based data access methods. In one embodiment, verification is built into the storage media by having a SHA1 for every block of data on the hard drive. The manifest then becomes a list of SHA1's for every block of data that is to be verified. Since many of the blocks of data on a hard drive may be identical, perhaps because they are unused, in one embodiment, the list is compressed to save space. In such a scenario, the manifest comprises approximately 20/512, or 4% of the disk space. If sequential blocks area used to form a larger block of 4096, or 4 Kbytes, of data, then the disk space required for the manifest reduces to approximately 0.5% of the disk space. With a 10 Gbyte hard drive, the manifest is approximately 50 Mbytes in size.

In another embodiment, using a method similar to that discussed above regarding file-based verification, hierarchical sections of SHA 1 values allow portions of the manifest list to be dynamically loaded on demand. For example, and not by way of limitation, the 50 Mbytes list is comprised of 2,500,000 SHA1 values. The list of SHA1's is broken down into 25,000 sections, each section comprises 100 SHA1 values. A higher level SHA1 list of 25,000 SHA1 values is used as the top level SHA1 values, where each SHA1 in this top level list is the SHA1 over one of the 25,000 sections of SHA1 values. This list is, therefore, about 500 Kbytes in size, which can easily be loaded into memory at boot time. When the operating system tries to read a block of data on the hard drive, the kernel determines which of the lower level 25,000 sections the block is associated. If this lower level section of 100 SHA 1 values is not in memory, then it is loaded. When the level is loaded, all 100 SHA1 values for the section are read into memory and the SHA1 over them is calculated. This SHA1 must match its corresponding SHA1 in the higher level list of 25,000 SHA1 values. If they do match, then the loaded section of 100 SHA1 values is verified, and the correct SHA1 value for the block can then be used to verify the contents of the 4096 byte block that is then loaded.

In still another embodiment, sections of the SHA1 lists and loaded are managed by a memory manager to determine when to release a section list to make room to load another section list on demand. Least recently used algorithms are used to determine which sections to discard. In one embodiment, by de-fragmenting a hard drive, even more efficiency is attained when using the block verification method across the entire hard drive.

When using manifests with file-based verification, it is possible to avoid loading all of the manifests. In one embodiment, the Linux system keeps in memory only the SHA1 value for the manifest on initial loading, and then loads the remainder of the manifest on demand. For example, in one embodiment, when a particular partition is mounted by the Linux OS, then the Linux kernel loads the manifest that pertains to that partition. When the manifest is loaded, its contents are checked against the SHA1 value that was loaded and stored in RAM during the boot process. This allows the manifest to be loaded after boot time to assure that it is authentic.

It should be noted that, while the invention has been described in the context of a gaming machine, the components of any device can be verified using the embodiments described herein. By way of example, and not by way of limitation, other exemplary devices that can be verified include: a kiosk, a cashier device, a plasma signage controller, a DNS server, a DHCP server, a database server, a web server, a cryptographic device, a firewall, a load balancer, a network monitoring unit, a network router, a download server, a certificate authority server, a cashless server, a progressive controller, a tournament controller, a display controller, a networking device, an Ethernet switch, a network hub, a cash transaction server, a third party payment server, a prize redemption machine, in room gaming device, a bingo game controller, a lottery game controllers, a class II gaming device, a class III gaming device, a lottery gaming device, an amusement gaming device, an arcade gaming machine, a regulator monitoring device, a VPN device; a player tracking device; a player marketing device, a slot management system, a home game console, an ATM banking machine, a debit card reader, a point of sale system, a cash register, a retail scanner, a RFID reader, a location security monitoring/security input device, a military device, a vending machine, a stock transaction server, a banking server, a cell phone, a personal digital assistant, a laptop computing device, an electronic wallet device, a smart card, a set-top box, a monetary input/output device, a biometric device, a user authentication device, a personal media player, a software network updatable device, a handheld scanner, a currency handler/counter, a lottery ticket purchase/redemption device, a player bingo device, a monitor, a television, a fax device, an electronic money transfer device, a USB device, a Bluetooth device, a fire wire capable device, a wi-fi enabled device, a robotic device, or a handheld gaming device or any other device that requires files to be verified in a timely manner.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A method of verifying gaming components using an authentication system to authenticate contents of a manifest in a gaming system including one or more processors, the method comprising:
    determining if the manifest is authentic using a digital signature check, the manifest having contents including a plurality of components each having a file name, a block indicator, an associated stored hash, a block size field indicating a size of each data block, and a block number field indicating a number of data blocks;
    booting an operating system, once the contents of the manifest are authenticated;
    performing a hash calculation over each component listed by file name in the authenticated manifest, as the component is needed, to produce a calculated hash;
    verifying each gaming component for which a hash calculation was performed by comparing the calculated hash to the associated stored hash and associated file name located within the manifest using the one or more processors; and
    loading the gaming component if the calculated hash and the stored hash are equal.

2. The method of claim 1, wherein authenticating the manifest includes performing a digital signature algorithm on the manifest.

3. The method of claim 1, wherein the component is verified when the component is retrieved for operation of a device.

4. The method of claim 3, wherein the component comprises a data file.

5. The method of claim 3, wherein the component comprises a data component stored in a partition of a digital storage medium, wherein the stored hash is a hash of the whole partition, and performing the hash calculation comprises performing the hash calculation on the whole partition if the partition has not yet been verified during operation of the device.

6. The method of claim 3, wherein the component comprises a data component stored in a library in a digital storage medium, wherein the stored hash is a hash of the entire library, and the performing of the hash calculation comprises performing the hash calculation on the entire library if the library has not yet been verified during operation of the device.

7. The method of claim 3, wherein the component comprises a data file stored in one or more data blocks in a digital storage medium, wherein the stored hash is a hash of the one or more data blocks, and the performing of the hash calculation comprises performing the hash calculation on each data block an as-needed basis as the file loads if the data block has not been verified.

8. The method of claim 3, wherein the component comprises a data file stored in one or more data sectors in a digital storage medium, wherein the stored hash is a hash of the one or more data sectors, and the performing of the hash calculation comprises performing the hash calculation on each data sector as the file loads on an as-needed basis.

9. The method of claim 1, wherein the component is verified on a continuing basis during operation of a device.

10. The method of claim 1, wherein the component is verified each time a critical event occurs for a device.

11. The method of claim 10, wherein the data component comprises a data file.

12. A method of verifying a component using an authentication system to authenticate contents of a manifest in a gaming system including one or more processors, the component having a plurality of sub-components, the method comprising:
    determining if the manifest is authentic using a digital signature check, the manifest having contents including a plurality of sub-components each having a file name, a block indicator, an associated stored hash, a block size field indicating a size of each data block, and a block number field indicating a number of data blocks;
    booting an operating system, once the contents of the manifest are authenticated;

performing a hash calculation over each sub-component listed by file name in the authenticated manifest, as the component is needed, to produce a calculated hash;

verifying the plurality of sub-components for which a hash calculation was performed by comparing the calculated hash to the associated stored hash and associated file name located within the manifest using the one or more processors; and loading the sub-component if the calculated hash and the stored hash for the sub-component are equal.

13. A system for verifying a component using an authentication system to authenticate contents of a manifest in a gaming system, the system comprising:

a processor;

a set of instructions that are executable on the processor for determining if the manifest is authentic using a digital signature check, the manifest having contents including a plurality of components each having a file name, a block indicator, an associated stored hash, a block size field indicating a size of each data block, and a block number field indicating a number of data blocks, wherein an operating system is booted, once the contents of the manifest are authenticated;

a set of instructions that are executable on the processor for performing a hash calculation over each component listed by file name in the authenticated manifest, as the component is needed, to produce a calculated hash;

a set of instructions that are executable on the processor for verifying the component for which a hash calculation was performed by comparing the calculated hash to the associated stored hash and associated file name located within the manifest; and a set of instructions that are executable on the processor for loading the component if the calculated hash and the stored hash are equal.

14. The method of claim 13, wherein the component is part of a device that is of a type selected from the group consisting of: kiosk, cashier device, plasma signage controller, DNS server, DHCP server, database server, web server, cryptographic device, firewall, load balancer, network monitoring unit, network router, download server, certificate authority server, cashless server, progressive controller, tournament controller, display controller, networking device, Ethernet switch, network hub, cash transaction server, third party payment server, prize redemption machine, in room gaming device, bingo game controller, lottery game controllers, class II gaming device, class III gaming device, lottery gaming device, amusement gaming device, arcade gaming machine, regulator monitoring device, VPN device; player tracking device; player marketing device, slot management system, home game console, ATM banking machine, debit card reader, point of sale system, cash register, retail scanner, RFID reader, location security monitoring/security input device, military device, vending machine, stock transaction server, banking server, cell phone, personal digital assistant, laptop computing device, electronic wallet device, smart card, set-top box, monetary input/output device, biometric device, user authentication device, personal media player, software network updatable device, handheld scanner, currency handler/counter, lottery ticket purchase/redemption device, player bingo device, monitor, television, fax device, electronic money transfer device, USB device, Bluetooth device, fire wire capable device, wi-fi enabled device, robotic device, and handheld gaming device.

15. A system for verifying a component using an authentication system to authenticate contents of a manifest in a gaming system including one or more processors, the system comprising a non-transitory computer usable medium having computer readable program code embodied therein configured for verifying a component using the one or more processors, comprising:

computer readable code configured to authenticate a manifest using a digital signature check, the manifest having contents including a plurality of components each having a file name, a block indicator, an associated stored hash, a block size field indicating a size of each data block, and a block number field indicating a number of data blocks;

computer readable code configured for determining if the contents of the manifest are is authenticated, and booting an operating system, once the contents of the manifest are authenticated;

computer readable code configured to perform a hash calculation over each component listed by file name in the authenticated manifest, as the component is needed, to produce a calculated hash;

computer readable code configured to verify each component for which a hash calculation was performed by comparing the calculated hash to the associated stored hash and associated file name located within the manifest using the processor;

computer readable code configured to load the component, if the calculated hash and the stored hash are equal.

16. A method of authenticating the contents of manifests on a writable media device in a gaming system including one or more processors, the method comprising:

authenticating a manifest using a digital signature check, the manifest having contents including a plurality of components each having a file name, a block indicator, an associated stored hash, a block size field indicating a size of each data block, and a block number field indicating a number of data blocks;

determining if the contents of the manifest are authenticated;

booting an operating system if the contents of the manifest are authenticated;

performing a hash calculation over each component listed by file name in the authenticated manifest, as the component is needed, to produce a calculated hash;

verifying each component for which a hash calculation was performed by comparing the calculated hash to the associated stored hash and associated file name located within the manifest using the one or more processors; and loading the component if the calculated hash and the stored hash are equal.

17. The method of claim 16, wherein a digital signature is used to authenticate the manifest.

18. The method of claim 16, wherein the one or more components are verified on an as-needed basis.

19. The method of claim 16, wherein the one or more components are verified on a continuing basis during operation of a device.

20. The method of claim 16, wherein the one or more components are verified each time a critical event occurs for a device.

21. The method of claim 16, wherein the one or more components comprise data files stored in a partition of a digital storage medium, wherein the stored hash is a hash of the whole partition, and the performing of the hash calculation comprises performing the hash calculation on the whole partition if the partition has not yet been verified during operation of the media device.

22. The method of claim 16, wherein the one or more components comprise data components stored in a library in a digital storage medium, wherein the stored hash is a hash of the entire library, and the step of performing the hash calculation comprises performing the hash calculation on the entire library if the library has not yet been authenticated during operation of the media device.

23. The method of claim 16, wherein the one or more components comprise data files stored in one or more data blocks in a digital storage medium, wherein the stored hash is a hash of the one or more data blocks, and the step of performing the hash calculation comprises performing the hash calculation on each data block as one of the files loads on an as-needed basis.

24. The method of claim 16, wherein the one or more components comprise data files stored in one or more data sectors in a digital storage medium, wherein the stored hash is a hash of the one or more data sectors, and the step of performing the hash calculation comprises performing the hash calculation on each data sector as one of the files loads on an as-needed basis.

25. A method of installing one or more data components using an authentication system to authenticate contents of a manifest in a gaming system including one or more processors, the method comprising:
creating a manifest having contents including a plurality of components each having a file name, a block indicator, an associated stored hash, a block size field indicating a size of each data block, and a block number field indicating a number of data blocks;
creating a digital signature of the manifest;
installing the one or more data components, the manifest, and the digital signature on a media device;
determining if the contents of the manifest are authenticated, and booting an operating system if the contents of the manifest are authenticated;
performing a hash calculation over each component listed by file name in the authenticated manifest, as the component is needed, to produce a calculated hash; and
verifying each component for which a hash calculation was performed by comparing the calculated hash to the associated stored hash and associated file name located within the manifest using the one or more processors;
wherein the digital signature is for authenticating the manifest, and the hash values are for verifying the one or more data components before loading on an as-needed basis.

26. The method of claim 25, wherein the step of installing includes performing the step of creating the digital signature on a host server computer, and downloading the one or more data components, the manifest, and the digital signature from the host server as a package.

27. The method of claim 25, wherein the step of creating the digital signature of the manifest is preformed after installation of the manifest on the digital media device, after downloading the one or more data components and the manifest from the host server as a package.

28. In a gaming machine, a method of verifying one or more files stored on a network associated storage device using an authentication system to authenticate contents of a manifest in a gaming system including one or more processors, the method comprising:
determining if a manifest is authentic using a digital signature check, the manifest having contents including a plurality of files each having a file name, a block indicator, an associated stored hash, a block size field indicating a size of each data block, and a block number field indicating a number of data blocks;
reading the file from the network associated storage device over a network connection if the manifest is authentic;
booting an operating system if the contents of the manifest are authenticated;
performing a hash calculation over each file listed by file name in the authenticated manifest, as the component is needed, to produce a calculated hash;
verifying each file for which a hash calculation was performed by comparing the calculated hash to the associated stored hash and associated file name located within the manifest using the one or more processors; and
loading the file if the calculated hash and the stored hash are equal.

29. The method of claim 28, further comprising booting the gaming machine using a plurality of files stored on the network associated storage device, wherein reading the file, performing the hash calculation, verifying the file, and loading the file are performed for each file, as needed.

30. The method of claim 29, wherein verifying the file includes performing a SHA-1 verification.

31. The method of claim 29, wherein network associated storage device comprises a network attached storage device.

32. In a gaming machine, a method of verifying one or more files stored on a diskless storage device using an authentication system to authenticate contents of a manifest in a gaming system including one or more processors, the method comprising:
determining if a manifest is authentic using a digital signature check, the manifest having contents including a plurality of files each having a file name, a block indicator, an associated stored hash, a block size field indicating a size of each data block, and a block number field indicating a number of data blocks;
reading the file from the diskless storage device if the manifest is authentic;
booting an operating system if the contents of the manifest are authenticated;
performing a hash calculation over each file listed by file name in the authenticated manifest, as the component is needed, to produce a calculated hash;
verifying each file for which a hash calculation was performed by comparing the calculated hash to the associated stored hash and associated file name located within the manifest using the one or more processors; and
loading the file if the calculated hash and the stored hash are equal.

33. The method of claim 32, wherein the diskless storage device comprises a solid-state storage device.

34. The method of claim 33, wherein the solid-state storage device comprises an erasable programmable read-only memory.

35. The method of claim 33, wherein the solid-state storage device comprises a safe random access memory.

* * * * *

UNITED STATES PATENT AND TRADEMARK OFFICE
CERTIFICATE OF CORRECTION

| | | |
|---|---|---|
| PATENT NO. | : 8,784,195 B1 | Page 1 of 1 |
| APPLICATION NO. | : 11/423370 | |
| DATED | : July 22, 2014 | |
| INVENTOR(S) | : Robert W. Crowder, Jr. | |

It is certified that error appears in the above-identified patent and that said Letters Patent is hereby corrected as shown below:

In the Specification

Column 7, In line 65, replace "is" with --has--

Column 9, In line 39, insert --.-- after "image""

Column 14, In line 51, before "are" add --s-- to "image"

Signed and Sealed this
Twenty-eighth Day of October, 2014

Michelle K. Lee
*Deputy Director of the United States Patent and Trademark Office*